US007672486B2

(12) United States Patent
Diederichs et al.

(10) Patent No.: US 7,672,486 B2
(45) Date of Patent: Mar. 2, 2010

(54) METHOD FOR EVALUATING THE QUALITY OF A PRINTED MATTER, PROVIDED BY A PRINTING MACHINE

(75) Inventors: Carsten Diederichs, Lemgo (DE); Volker Lohweg, Bielefeld (DE); Thomas Türke, Bielefeld (DE); Harald Heinrich Willeke, Paderborn (DE)

(73) Assignee: Koenig & Bauer Aktiengesellschaft, Wurzburg (DE)

( * ) Notice: Subject to any disclaimer, the term of this patent is extended or adjusted under 35 U.S.C. 154(b) by 791 days.

(21) Appl. No.: 11/587,149

(22) PCT Filed: Apr. 6, 2005

(86) PCT No.: PCT/EP2005/051525

§ 371 (c)(1),
(2), (4) Date: Oct. 20, 2006

(87) PCT Pub. No.: WO2005/104034

PCT Pub. Date: Nov. 3, 2005

(65) Prior Publication Data

US 2007/0223789 A1 Sep. 27, 2007

(30) Foreign Application Priority Data

Apr. 23, 2004 (DE) ....................... 10 2004 019 978

(51) Int. Cl.
*G06K 9/00* (2006.01)
*H04N 1/40* (2006.01)

(52) U.S. Cl. ....................... 382/112; 382/224; 358/3.02

(58) Field of Classification Search ................. 382/100, 382/112, 113, 135, 137, 138, 139, 140, 141, 382/149, 168, 181, 209, 224, 232, 255, 260, 382/274, 275, 276, 287–298, 305, 312, 321; 358/3.02; 700/223; 162/198; 381/60; 356/394
See application file for complete search history.

(56) References Cited

U.S. PATENT DOCUMENTS 3,800,155 A 3/1974 Potenza (Continued)

FOREIGN PATENT DOCUMENTS

| | | |
|---|---|---|
| DE | 101 32 589 A1 | 1/2003 |
| DE | 102 34 085 A1 | 2/2004 |
| DE | 102 34 086 A1 | 2/2004 |
| DE | 103 14 071 B3 | 9/2004 |

(Continued)

*Primary Examiner*—Seyed Azarian
(74) *Attorney, Agent, or Firm*—Jones, Tullar & Cooper, P.C.

(57) ABSTRACT

The quality of printed matter, which is one of several copies of the same printed matter produced by a printing machine, is evaluated. An amount of copies of the printed matter is selected from the total production of this printed matter. The selected amount of these copies are evaluated with regard to at least one error type which belongs to an amount of different error types or with regard to at least one feature of the error. Within the selected amount of copies, an error of a defined error type or of a defined feature, which is detected on at least one of the copies, is evaluated in relation to at least one error of another type or feature detected on the same copy, or another copy of the selected amount. The printed matter is classified as having good or bad quality based on that evaluation. A common reading, producing image data, is obtained by an image sensor from the selected copies. All of the errors to be evaluated in relation to each other are detected from image data gathered during the same common recording.

76 Claims, 5 Drawing Sheets

U.S. PATENT DOCUMENTS

| | | | | | |
|---|---|---|---|---|---|
| 4,197,584 | A * | 4/1980 | Blazek | ........................ | 356/394 |
| 4,879,000 | A * | 11/1989 | Gausa | ........................ | 162/198 |
| 6,074,081 | A * | 6/2000 | Smith et al. | ................. | 700/223 |
| 6,101,266 | A * | 8/2000 | Laskowski et al. | .......... | 382/135 |
| 6,151,534 | A * | 11/2000 | Smith et al. | ................. | 700/223 |
| 7,184,584 | B2 * | 2/2007 | Sacher et al. | ............... | 382/141 |
| 7,269,262 | B2 * | 9/2007 | Iseberg et al. | ................. | 381/60 |
| 2002/0043560 | A1 | 4/2002 | Woods et al. | | |
| 2004/0179724 | A1 | 9/2004 | Sacher et al. | | |
| 2005/0259869 | A1 | 11/2005 | Lohweg et al. | | |
| 2006/0050995 | A1 | 3/2006 | Lohweg | | |

FOREIGN PATENT DOCUMENTS

| | | | |
|---|---|---|---|
| DE | 103 35 147 | A1 | 3/2005 |
| EP | 0 553 402 | A1 | 10/1992 |
| EP | 0 660 276 | A2 | 6/1995 |
| EP | 0 982 690 | A1 | 3/2000 |
| EP | 1 168 252 | A2 | 1/2002 |
| EP | 1 168 252 | A3 | 12/2004 |
| WO | WO 2005/013207 | A1 * | 7/2004 |

* cited by examiner

METHOD FOR EVALUATING THE QUALITY OF A PRINTED MATTER, PROVIDED BY A PRINTING MACHINE

CROSS-REFERENCE TO RELATED APPLICATION

This patent application is the U.S. national phase, under 35 U.S.C. 371, of PCT/EP2005/051525, filed Apr. 6, 2005; published as WO 2005/04034 A1 on Nov. 3, 2005 and claiming priority to DE 10 2004 019 978.7, filed Apr. 23, 2004, the disclosures of which are expressly incorporated herein by reference.

FIELD OF THE INVENTION

The present invention is directed to a method for evaluating the quality of printed matter produced by a printing press. The printing press produces a plurality of copies of the same printed matter. A certain quantity of these copies are selected for quality evaluation with regard to one or more errors.

BACKGROUND OF THE INVENTION

The print quality of printed images produced by a printing press has typically been checked, during a production run, by the operators of the printing press, either visually or with the use of optical aids. A classification is determined based on the evaluation of the printed images by operators. The printed product is classified into groups of printed matter with predetermined characteristics, such as, for example, based on certain error characteristics that were the object of the evaluation that was performed. All the printed matter that was examined is divided into a first component or class of good quality and a second component or class of lower quality, typically products which are determined not to be usable or saleable, and the printed image of the printed matter to be evaluated is classified as good or as poor, or as containing errors. The evaluation of the quality of printed matter produced by a printing press, by the printing press operating personnel, is subject to considerable fluctuations. This is because the evaluation depends on the judgment of the person in question, and in particular depends on his or her knowledge and experience. As a result, this judgment may be different from person to person.

In the printing industry, camera systems are now increasingly being used for various applications, such as, for example, in inspection systems, in web inspection systems, or in register measurement systems, with these systems typically being arranged on a printing press or in a machine for processing printed matter. These systems perform their functions, for example, "inline," or during ongoing production of the printed matter to be produced. This results in a considerable challenge for the respective camera system and for an image processing system which is evaluating the camera's image data. Such challenges are often due to the large amount of data which is produced by such a camera system, and due to the rapid process progression in the production of the printed matter. The problem is exacerbated if the printed matter has recognition features which are difficult to identify using spectral photometry and if it is necessary, during the quality control to, for example, make a reliable evaluation of these recognition features in spite of the short time which is allotted for each evaluation due to the usually high speed at which the printed matter is transported. In addition, in security printing, such as, for example, in the production of bank notes, official stamps, or official documents, each individual recognition feature of the printed matter should preferably be subjected to an evaluation. At the same time, for economic reasons alone, there is the requirement, in particular in connection with high-value printed matter such as is used, for example, in the production of bank notes or official stamps, to keep the amount of waste of such printed matter as low as possible, precisely because of their high material and production costs, as long as this low amount of waste is justifiable after taking into account a predetermined level of quality which must be maintained.

In the typical camera systems, as discussed above, a number of electronic image sensors are used for image capture. In particular, color cameras having at least one image sensor comprising, such as, for example, a CCD chip, and whose light-sensitive pixels send an output signal corresponding to the color captured in the observation area, for example, in three separate signal channels, the color channels usually being used for the colors red, green, and blue are often used.

The output signal of an image capture unit, such as, for example the image data of the image captured by the image capture unit, typically needs to be evaluated using an image processing system that is connected to the image capture unit. This evaluation should be accomplished in such a way that an appropriate and balanced evaluation is made of the quality of the printed matter produced by a printing press. In order to evaluate its quality, the printed matter is preferably checked with regard to various criteria.

DE 103 35 147 A1, which was published subsequent to the priority filing date of the subject application, discloses a method for detecting the state of bank notes in which data of at least two different characteristics of the bank notes are evaluated. The data of the at least two different characteristics of each bank note are linked with one another, and the state of the quality of the bank notes is determined from the linked data of the different characteristics. Provision may also be made for an average value to be determined for each of the different characteristics for a number of bank notes in order to determine the state of the quantity of the bank notes for each different characteristic. Alternatively, an average value may be determined for the linked characteristics for a quantity of bank notes in order to determine the overall state of the quantity of bank notes.

DE 103 14 071 B3, which was also published later than the priority filing date of the subject application, relates to a method for qualitative evaluation of a material having at least one recognition feature. A color image is captured, by an electronic image sensor, of at least the one recognition feature. The image sensor directly or indirectly provides a first electrical signal corresponding to the color image. An analysis device, which is connected to the image sensor, evaluates the first electrical signal. A second electrical signal is derived from at least one reference image and is stored in a data storage unit. The second electrical signal has a corresponding target value for the first electrical signal for at least two different characteristics of the reference image. The first signal is compared to at least two of the target values contained in the second electrical signal. At least the color image of the recognition feature is evaluated in the comparison for a color deviation from the reference image. The recognition feature is checked for belonging to a certain class of recognition features or to a certain geometric contour or to a relative arrangement to at least one other recognition feature of the material. Here, the material may be embodied as a bank note or as an official stamp. Each case mentioned above deals with the testing of a material, or with the testing of an individual piece, in which testing the at least one recognition feature of the material in question is checked in testing processes that are different from each other yet which are running independently next to one another with regard to certain criteria.

DE 102 34 086 A1 discloses a method for signal evaluation of an electronic image sensor using pattern recognition of image contents of a test piece. A decision is made regarding the particular class to which a test piece belongs. The method provides for the content of a captured image of the test piece to be evaluated using a classification function that uses methods of fuzzy logic. It is also possible for several classification functions to be linked to one another to form one overarching classification function.

DE 102 34 085 A1 discloses a method for the analysis of color deviations of images captured by an image sensor. The image signal received by the image sensor is analyzed pixel by pixel.

DE 101 32 589 A1 discloses a method for the qualitative evaluation of printed material having at least one recognition feature. An image of the material to be evaluated is captured by one image sensor, and the geometric contour and/or the relative arrangement of several recognition features relative to one another is measured for this image in an analysis device.

SUMMARY OF THE INVENTION

The object of the present invention is directed to the production of a method for evaluating the quality of printed matter produced by a printing press, with the errors that occur during the production of several copies of this printed matter being evaluated in a balanced fashion.

This object is attained according to the invention by the evaluation of the quality of a quantity of products which are selected from a larger group of copies of the same printed matter. The copies of the selected quantity are evaluating with regard to one error type which belongs to a number of different error types or with regard to at least or characteristic belonging to a number of different characteristics of an error. An error of one type or characteristic is evaluated with respect to another error of a different type or characteristic detected on the same copy.

The advantages that can be attained by the present invention lie particularly in the fact that the evaluation of the quality of printed matter produced by a printing press is accomplished in a very balanced fashion on a broad basis. Each error that is. detected is not evaluated on its own, but rather is evaluated in context with other errors that have been detected. A unified evaluation of all of the errors that occur within a selected quantity of copies takes place by virtue of the fact that the errors are evaluated in relation to one another. As a result, a yield of the printed matter copies, that are classified as saleable or at least able to be processed further, is increased. In this manner, the method in accordance with the present invention increases the productivity and the economy in the production process of the printed matter. A necessary level of quality is ensured and unnecessary misprints are prevented.

A common data capture of the copies, in the selected quantity of copies of the printed matter, is produced by one image sensor. Accordingly, no differences in position, such as, for example, errors in the copies respective positional specification, are apt to arise between the detected errors. The image data that have been captured are evaluated in a pixel-precise fashion, such that, in the calculations for evaluating the quality of copies of the printed matter produced by a printing press, correcting for the calculated positions of detected errors is not necessary. Such a correction, in contrast, is necessary when errors are detected by multiple sensors, such as, for example, by several sensors that are positioned in various locations in relation to the copies of the printed matter to be examined. Therefore, it is a particular advantage of the subject invention that all of the errors that are to be evaluated, in relation to one another, may be detected from image data from the same data capture process.

Errors which are detected in a produced piece of printed matter are preferably weighted depending on their topology. These errors are, for example, collected into a superordinate, multi-dimensional categorization function and are evaluated by examining all of the detected errors, together with reference to a classification threshold, and preferably to one that may be parameterized as needed. The method may also be used for the purpose of evaluating the judgment derived from the image data, with regard to a slowly increasing deviation in the quality of produced printed matter. A slowly increasing deviation in the quality of produced printed matter may be detected before it grows into an error that would result in the production of produce misprints.

The method for evaluating the quality of printed matter, in accordance with the present invention, is particularly well suited for evaluating the quality of high-grade printed matter that is used in the production of expensive printed matter, such as, for example, in the production of printed matter which is printed using high-quality printing, such as, for example, a bank note or an official stamp.

BRIEF DESCRIPTION OF THE DRAWINGS

A preferred embodiment of the present invention is shown in the drawings and is described in greater detail in the following.

Shown are.

DESCRIPTION OF THE PREFERRED EMBODIMENT

Figure 1:
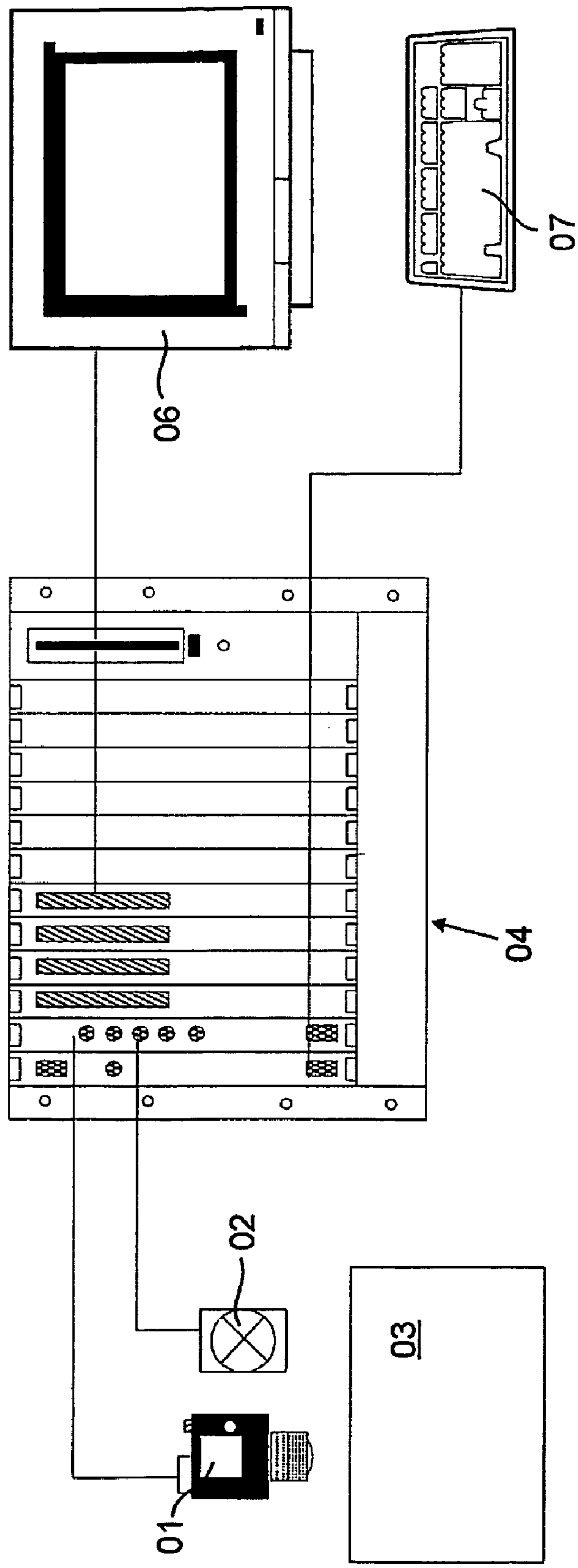
FIG. 1 a schematic depiction of an inspection system usable in the present invention.

For the purpose of evaluating the quality of printed matter, which is produced by a printing machine, and in accordance with the schematic depiction, which is shown in FIG. 1, an inspection system, which may be used by way of example, has an image capture unit 01 which may be embodied, for example, as several color line cameras 01 which are coupled with one another or as a color surface camera 01 that captures a printed image 03 which is lit by a lighting device 02. The printed image 03 typically is produced by a printing press on a printing material, which is not specifically shown, and which is composed, for example, of paper. Image data of the individual color channels, which are detected by the image capture unit 01 from the capture of the printed image 03, are evaluated in an image processing system 04. The output of the result of such an evaluation is shown, for example, on a monitor 06 which is connected to the image processing system 04. Input, for example, of parameters that must necessarily be provided to the image processing system 04 for its calculations, is made via a keyboard 07 that is also connected to the image processing system 04. The image capture unit 01 is arranged in the printing press in such a way that each image which it captures includes the respective printed images of each of several copies of the printed matter that is being produced in this printing press.

The printing press is preferably embodied as a rotary printing press, and in particular is embodied as a printing press which is printing in one of an offset printing method, in a steel engraving printing method, in a serigraphy printing method, or in a hot embossing method. If the printing press is embodied as a sheet-fed printing press, it must be provided that the sheet can be inspected, even at a machine speed of, for example, 18,000 sheets per hour. If the printing material to be printed is a material web, the inspection system should be able to analyze the quality of the copies of the printed matter, which is moved through the printing press at a machine speed of, for example, 15 m/s, to a single piece monitoring.

In the production of the printed matter which quality is to be checked, which printed matter may be for example, a bank note, errors that typically occur may be divided into certain types of errors, for example:

a) color errors, such as when an incorrect color has been printed at a certain point on the printing material, b) intensity errors, when, although the correct hue has been printed at a certain point on the printing material, it has not been printed in the desired, correct intensity, c) contour errors, when the printed image or a recognition feature of the printed image is at least partially erroneous with regard to its outline, and in particular, is incomplete, or d) positioning errors, when, for example, a window line or another recognition feature of the printed image is missing or appears in an incorrect position.

The types of errors which typically occur may be divided again with regard to certain characteristics. Specifically, they may be divided as to whether the error of a certain error type occurs in a sequence of several copies of the printed matter which is produced by the printing press, i:e., as individual errors or multiple errors. It is also possible for color errors and for intensity errors, in particular, to be classified and to be evaluated with regard to their respective degree of error, such as, for example, with regard to the extent of the error, in terms of area. In addition, the quality of the printed matter may be evaluated at least with regard to certain types of errors and/or a quantity of errors and/or a degree of error.

Based on the production method which is being used in the printing press, it is to be assumed that printing errors, which are occurring in several consecutive printed copies of the printed matter will occur in columns relative to the printing cylinders of the printing group. In other words, the errors repeat themselves on the printing material in a line that may be defined by its direction of movement through the printing group, whereby a further characteristic of an error may be defined. As needed, the types of errors and/or the characteristics mentioned above may be expanded using further error features. In particular, for the purpose of performing the method for evaluating the quality of printed matter, in accordance with the present invention, in a machine arranged downstream of the printing press, it should also be noted, as a side consideration, that an inspection of the printing material, for example, in a so-called half-sheet evaluation, can also occur with alternating halves.

An initial situation for the method for evaluating the quality of printed matter may exist, for example, such that several inspection channels "i" are provided, with "i"=1 to imax, where here, for example, imax=4 to correspond to the four error types; color errors, intensity errors, contour errors, and positioning errors. For each individual copy of the printed matter, the number of errors M is taken into account with M=1 to Mmax or the magnitude of errors N is taken into account with N=1 to Nmax pixels of the image sensor is to be evaluated. For several consecutive printed copies of the printed matter, printing errors that occur are taken into account using the number K of errors m occurring in a column s with K=1 to Kmax as well as the use or non-use of half-sheet evaluation as a yes/no decision. The method of the present invention preferably provides for, for example, the four inspection channels "i", the number of errors M or the magnitude of errors N, and the number K of errors m contained in the same column s to be fuzzied. Defuzzying, in order to evaluate the quality of printed matter, may be performed in a simple evaluation of a numerical value L resulting from the evaluation method, in that a determination is made whether the numerical value L resulting from the evaluation method is greater than a set threshold value Lmax, i.e., L>Lmax. By setting the threshold value Lmax, a grade is established from which the produced printed matter is to be classified as either good or bad. The threshold value Lmax establishes the required level of quality for the printed matter. In so doing, all errors and/or characteristics to be evaluated, in relation to one another, are detected from the image data from the same capture by the image sensor. This means that the coordination of the image data, with regard to the location of a detected error and/or with regard to a detected characteristic, is not necessary.

Figure 2:
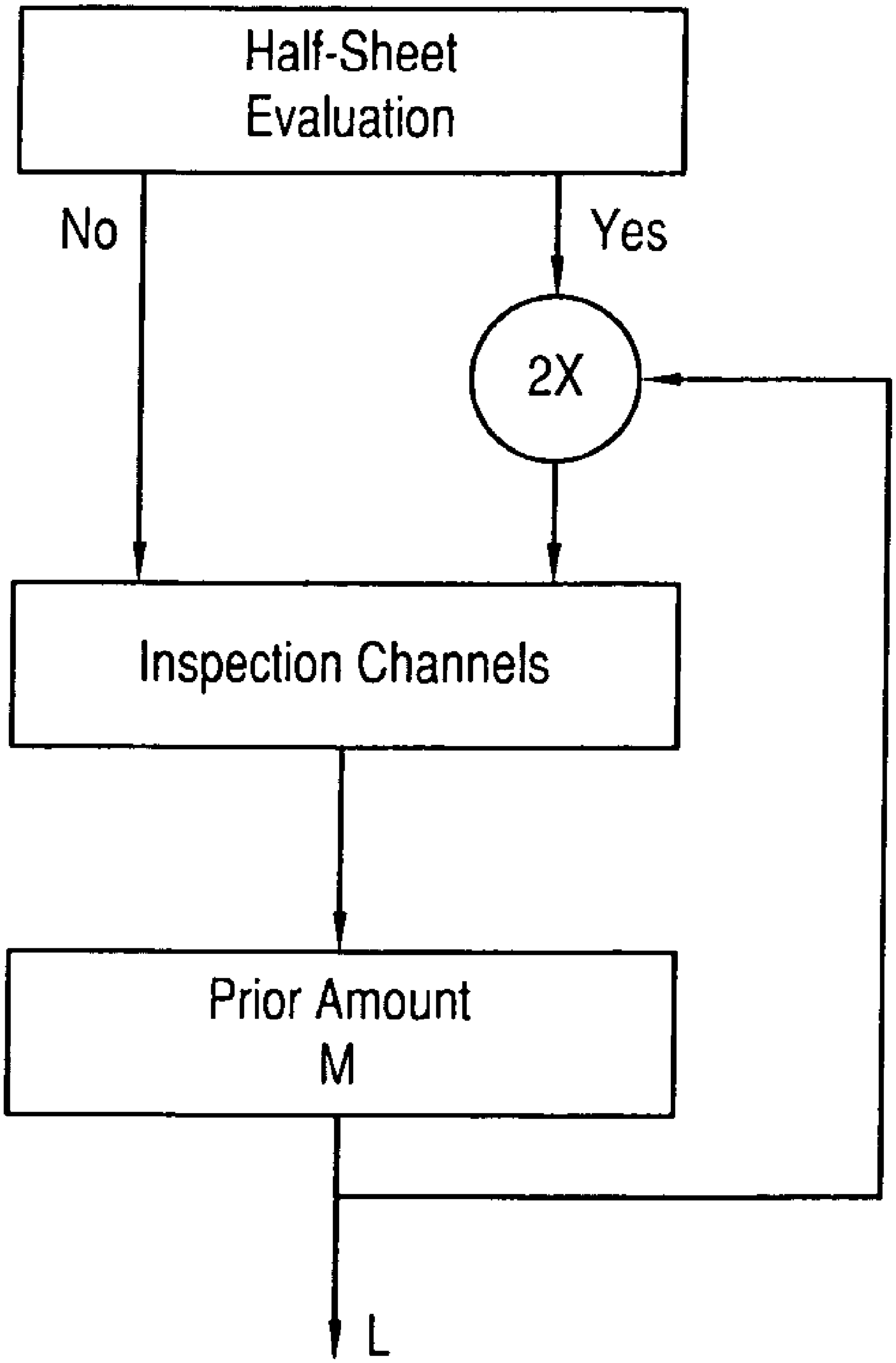
in FIG. 2 one part of the method in accordance with the present invention, in a signal flow diagram.

Part of the progression of the method for evaluating the quality of printed matter is shown, by way of example, in a signal flow diagram in FIG. 2. The progression shows the hierarchical structure of the method.

The fuzzification may provide for the inspection channels "i" to be assigned, for example, linearly in a first classification function pc, for example, μc=¼*i with i{1 to 4}. The number of errors M is also assigned, for example, linearly to a second classification function μf, with the number of errors M being preferably limited to a maximum number Mmax of errors m by virtue of the fact that the detected errors m are weighted, for example, with the maximum number Mmax of errors m as a weighting factor. The second classification function pf then results as μf=1/Mmax*m with m{1 to Mmax}.

The method for evaluating the quality of printed matter preferably provides for the first classification function pc and the second classification function pf to preferably be aggregated conjunctively. In other words, both of the classification functions μc; μf are linked with one another by multiplication. The multiplication of the two classification functions μc; μf results in a new aggregate classification function μg1, which may be represented, as follows, in accordance with the example described here:

$$\mu g1 = \mu c * \mu f = \tfrac{1}{4} * 1/\text{Mmax} * i * m \text{ with } i\ \{1 \text{ to } 4\} \text{ and } m\ \{1 \text{ to Mmax}\}$$

Figure 3:
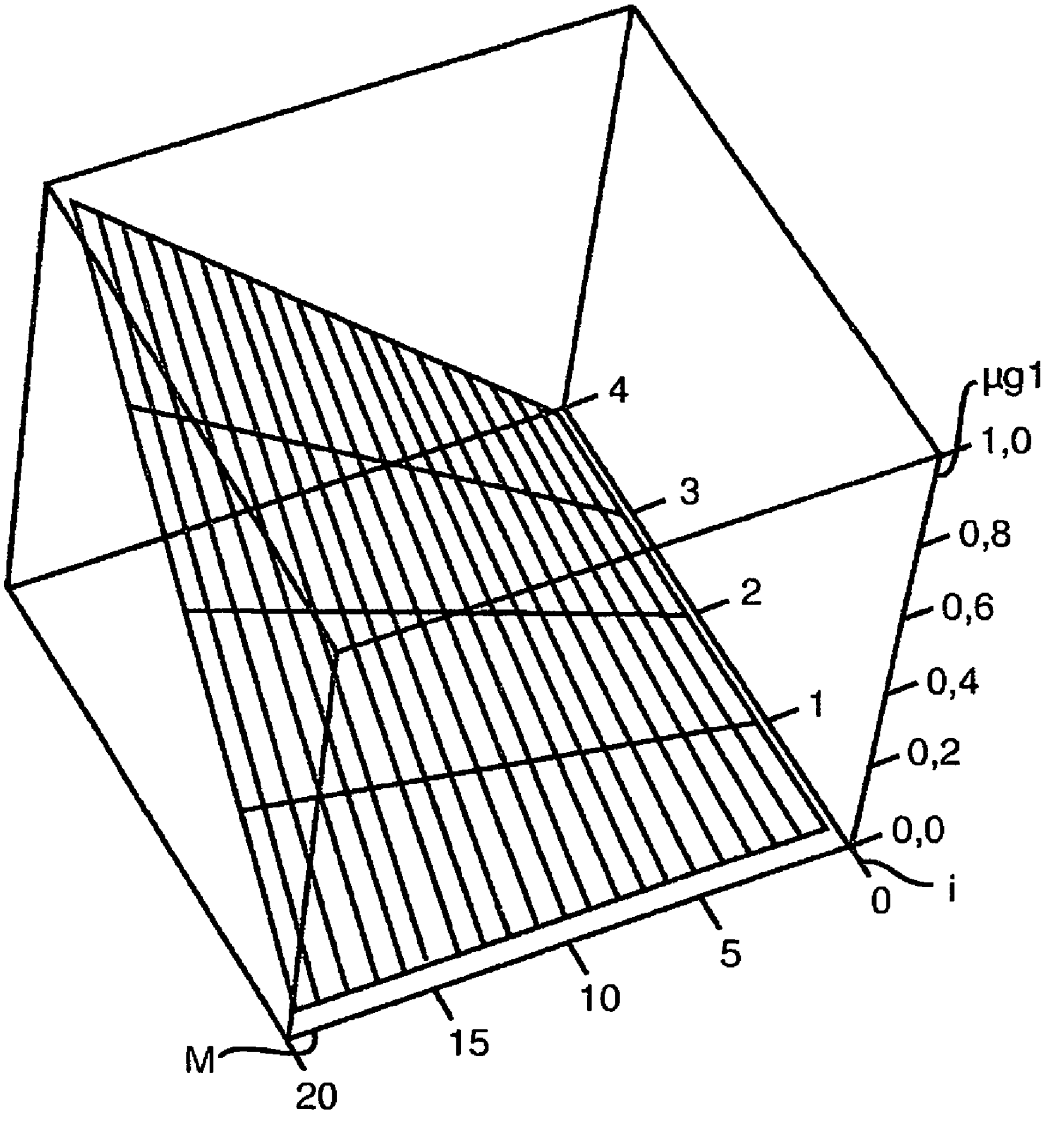
in FIG. 3 a graphical depiction of a first aggregated classification function.

FIG. 3 shows a graphic depiction of the first aggregate classification function μg1, with, for example, 4 inspection channels "i" and with the value Mmax=20 selected for the number of errors M. The first aggregate classification function μg1 has a value range between 0 and 1.

The number K of errors m occurring in a column s can be fuzzified as well, again preferably linearly, under the provision that, in the column s, a number Ns of copies of consecutively printed matter are evaluated, such that, a third classification function may be established as μs, where μs=1/Na*s with s {1 to smax}. The third classification function ps may also be conjunctively aggregated with the first classification function pc and/or with the second classification function μf. For example, a conjunctive aggregation of all three classification functions μc; μf; μs results in a second aggregated classification function μg2, which may be described as follows:

$$\mu g2=\mu s*\mu g1=\tfrac{1}{4}*1/Mmax*1/Ns*i*m*s$$

with i {1 to 4}, m {1 to Mmax}, and s {1 to smax}

For simplicity's sake, in each of the three classification functions μc; μf; μs, linear assignments have been made for their respective components. Naturally, nonlinear assignments may be used as needed for one or more of the classification functions μc; μf.

Figure 4:
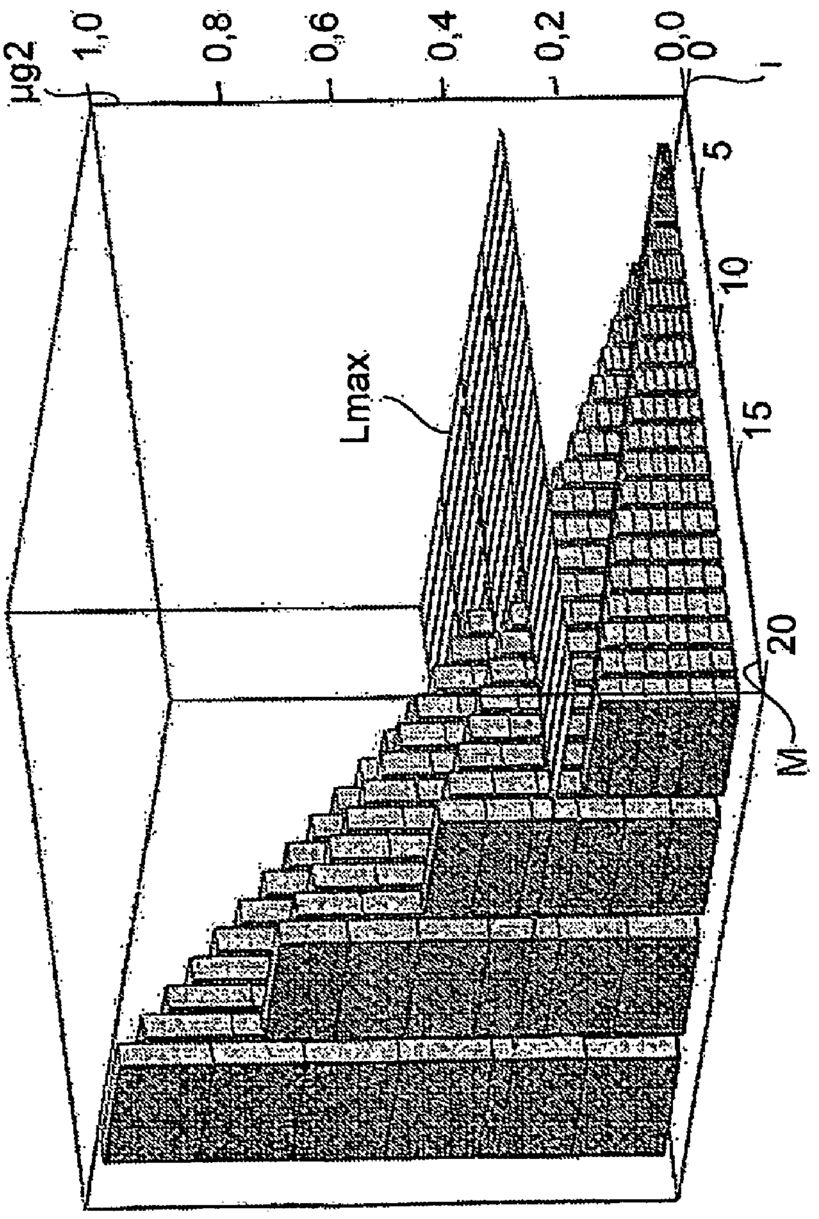
in FIG. 4 a graphical depiction of a second aggregated classification function; and in FIG. 5 a graphical depiction of a parameterized second aggregated classification function.

FIG. 4 represents a graphic depiction of this second aggregated classification function μg2, with four inspection channels i, with the value Mmax=20 selected for the number of errors M, and with the value Ns=6 selected for the number Ns of consecutively printed copies. Like the first aggregated classification function μg1, the second aggregated classification function μg2 has a value range between 0 and 1, as shown on the vertical axis of the diagram. The linear assignments, which are selected here by way of example, are clearly discernible. The second aggregated classification function μg2 is a multidimensional function, here a four-dimensional function, with the vertical axis of the diagram being used twice for its depiction, specifically for the depiction of the number Ns of consecutively printed copies of the printed matter per column s and for the depiction of the value range of this second aggregated classification function μg2. This double usage is made possible by overlaying the individual copies of the printed matter for each column s with the respective inspection channels i, with a block size shown in the diagram being respectively enlarged with each addition of another inspection channel "i".

According to the depiction of the second aggregated classification function μg2, which is shown in FIG. 4, a threshold value of Lmax has been defined for the value of μg2=0.3 by a horizontal plane which is running parallel to the base of the diagram, and with the plane comprising a classification threshold Lmax. The classification threshold Lmax is defined depending on the given application, or in other words depending on the currently necessary quality of the printed matter to be produced, and preferably with μg2 in the range of 0.2 and 0.4. It can be seen, from the example shown in FIG. 4, that, using the parameters selected here by way of example, in the case of error detection with only one individual inspection channel "i", i.e., "i"=1, even in the case a quantity of errors M of 15 errors m, a copy of the printed matter to be tested for its quality can still be judged as good. Not until error detection, with two inspection channels "i", i.e., "i"=2 and with a quantity of errors M of 10 errors m per copy of printed matter to be evaluated, is a printed sheet, for example, under the condition that Ns=6, evaluated as being of lower quality and preferably is removed from the flow of production.

In a further development, the second aggregated classification function μg2 may, for example, be parameterized, for example, to the effect that a weighting g may be controlled with regard to the inspection channels i. In this case, the following description results for the second aggregated classification function μg2, for example:

$$\mu g2=1/Mmax*1/Ns*m*s*(i/4)^{g}$$

with i {1 to 4}, m {1 to Mmax}, s {1 to smax}, and g=0 to 1

Figure 5:
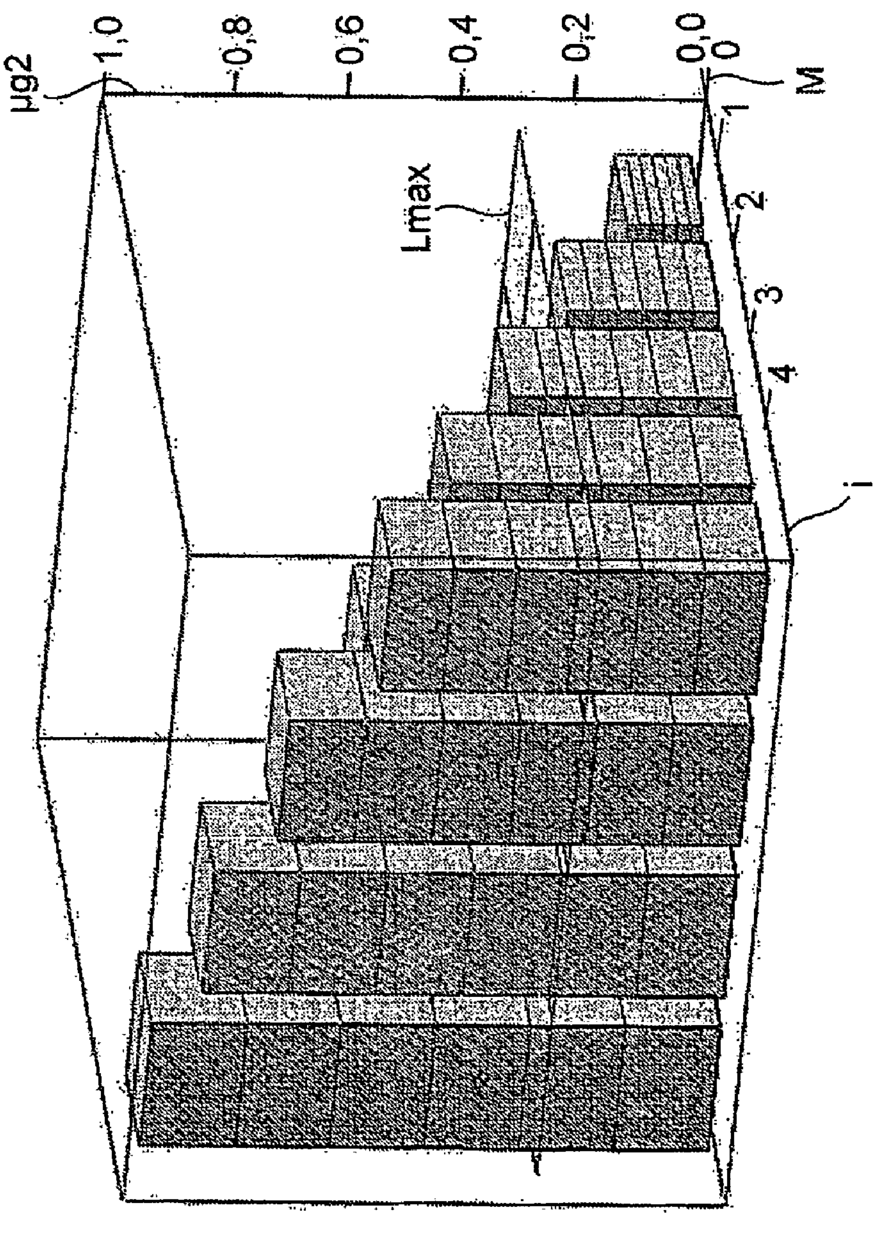

FIG. 5 represents a graphic depiction of a parameterized second aggregated classification function μg2, with 5 inspection channels "i", with the value Mmax=20 selected for Mmax, with the value Ns=6 selected for Ns, and with the weighting g of g=3 selected for the inspection channels "i". The classification threshold Lmax was again set at μg2=0.3.

In the method for evaluating the quality of printed matter in accordance with the present invention, the number of errors M may also be replaced by the magnitude of errors N. Alternatively, the magnitude of errors N may be used as a further criterion.

In its application, the method for evaluating the quality of printed matter in accordance with the present invention means that each individual error that is detected, for example, on one printed sheet, does not necessarily cause this one printed sheet to be discarded as a misprint. Rather, each individual detected error is evaluated in its context. By the use of mathematical processes, and, in particular, by using methods of fuzzy logic, the severity of each error is weighed and/or evaluated, in particular, in mutual dependence upon other detected errors and/or in relation to other detected errors. Thus, an overall evaluation is performed of all of the errors that occur within the number of copies of the printed matter being printed, such as, for example, on a particular sheet. The errors which are detected within the selected number are evaluated in their respective relationship to one another. The evaluation of the errors, in their respective relationship to one another, is facilitated by virtue of the fact that all of the errors to be evaluated are captured by the same image capture unit 01, in a nearly simultaneously manner and all of the information, which is necessary for the evaluation of the quality of the printed matter, may be derived from the image data corresponding to the same image capture.

In the case of bank notes that are produced using a steel engraving process, the risk of errors is comparably high. Additionally, the material costs, as well as the overall production costs of this printed matter, are also relatively high. Using the method described above, it is possible, during the actual printing process, to make a preliminary selection with regard to the printed sheets. Sheets that are printed, and which contain a number of errors that does not exceed the classification threshold Lmax are, for example, sent to a machine that continues to process the sheets. Each copy of the printed matter on the page in question may then be subjected to another individual inspection. Such a machine that continues to process the sheets, and that is disposed downstream of a printing press, may be, for example, a cutting device, and in particular may be a cutting device for use in separating the copies of the printed matter which are printed on each sheet, and which previously represented a certain numerically limited number of copies, for the purpose of evaluating their quality. Such a numerically limited number of copies may include several tens or several hundred or more of copies of the printed matter. In the production of the printed matter, several such quantities to be selected for the quality examination, which several quantities preferably contain the same number of copies, follow one another in the flow of production. Thus, a predetermined number of consecutively produced copies may be combined into one quantity of copies, with several such quantities of copies being formed one after the other. Preferably, all of the produced copies will be assigned to one of these quantities. Also, it is preferable for one capture to be made of each of these quantities of the respective copies, in order to subject the copies of the printed matter that have been produced to a seamless evaluation of their quality.

Each sheet containing several copies of the printed matter, such as, for example, several bank notes, may now be subjected to a further quality evaluation. In subsequent processing, for example, the copies of the printed matter that either contain very severe errors or that contain a particularly high number of errors may be excluded, in a targeted manner, from the quantity of copies of the printed matter that had previously been classified as good. Because the entire sheet was not classified as misprints in the preliminary evaluations, the yield of produced printed matter increases. At the same time, by virtue of presorting, subsequent processing is not encumbered with sheets that have a high number of errors.

An additional analysis of the evaluation derived from the image data with regard to a slowly building deviation in the quality of produced printed matter is undertaken, preferably by correlating it with data of at least one machine sensor. Such a machine sensor may be, for example, a vibration absorber on a machine frame of the printing press. In the case of a printing press printing with an offset printing method, such as a wet offset printing method, the machine sensor may also be embodied as a sensor which is monitoring the moisture medium. In the case of a printing press that is printing with an offset printing method and possibly with a wet offset printing method or a steel engraving method, it may also be appropriate to use one sensor to detect the temperature of, for example, a tempering medium that is tempering the forme cylinder of the printing press, and in particular a cooling medium which is cooling the forme cylinder, and to include the measurement data of this sensor additionally in the quality evaluation of the printed matter which is produced by the printing press. In the case of a printing press which is printing using the steel engraving method, it may also be reasonable to additionally monitor the electricity use of the rinsing device that is usable for removing the excess ink from the steel engraving printing plate. Such monitoring can be done by the use of a machine sensor and the information that may be derived from the measurement signal of this machine sensor regarding an amount of rinsing that is too high or too low, can be included in the quality evaluation of the printed matter produced by the printing press.

As a result, errors which are detected from the common capture in the printed image of the printed matter to be produced are evaluated in their respective relationship to one another. The evaluation which is derived in this manner is able to be additionally linked with the information from at least one further machine sensor in a control device performing the evaluation in order, in particular, to accomplish the early detection of a deviation, and in particular a slowly building deviation, in the quality of the produced printed matter. It is possible for the control device to derive information, from the measurement signals of the at least one other machine sensor, that the printing press is, for example, in an operating state that is considered critical in printing technology, such that it is probable that errors, which will cause misprints, will soon occur on the copies of the produced printed matter. It is preferably possible for the control device to intervene in the printing process as early as at this point. At least one aggregate of the printing press, which is influencing the printing process, is preferably automatically updated by the control device in order to switch the printing machine from its technically critical operating state to its normal operating state. Thus, a control process or a regulation process, which is evaluating the measurement signals of the machine sensors, serves as an early recognition of negative influences that are relevant to the printing process. The evaluation which is derived from the printed image of the produced printed matter confirms, in particular, the adherence to quality standards and, if necessary, provides documentation in the way of a proof of quality.

On the other hand, and depending on the evaluation of their quality, as derived from the printed image of the produced printed matter, those aggregates of the printing press that are in a critical operating state may be subsequently regulated. A machine sensor is preferably assigned to monitor every aggregate that influences the printing process. The control device which detects the at least one aggregate that is negatively influencing the printing process, by use of the detected errors and/or, for example, by the respective measurement signals of the respective machine sensors changes at least one setting of the at least one detected aggregate until such a time as the evaluation of the quality of this printed matter, as derived form the printed image of the produced printed matter, has again reached a level that may be classified as good. In this case, in conjunction with the evaluation which was derived from the printed image of the produced printed matter, adjustments of aggregates of the printing press are evaluated with the pertinent machine sensors with regard to their relevance to the quality of the printed matter to be produced and, if necessary, are preferably automatically changed by the control device in order to adhere to the quality standards.

While preferred embodiments of a method for evaluating the quality of printed matter produced by a printing press, in accordance with the present invention, have been set forth fully and completely hereinabove, it will be apparent to one of skill in the art that various changes in, for example the type of printing press used, the specific structure of the sensors and the like could be made without departing from the true spirit and scope of the present invention which is accordingly to be limited only by the appended claims.

What is claimed is:

1. A method for evaluating the quality of printed matter produced by a printing press or printing machine, with the printing machine producing several copies of the same printed matter, comprising the method steps of:

(a) providing an inspection system including an image sensor adapted to create an image data signal in response to sensing the printed copies;

(b) selecting a quantity of copies from the produced copies of the printed matter;

(c) evaluating said image data for the copies in said selected quantity with regard to at least one error type selected from a group of different error types including a color error, an intensity error, a contour error or a positioning error, where, within the selected quantity of copies, an error of a particular error type detected on at least one of the copies is evaluated in relation to at least one error of a different error type detected on the same copy or on a different copy;

(d) fuzzifying each of said types of errors in a classification function (μc:μf:μs); and (e) classifying the printed matter as being of good or poor quality based on the evaluation, wherein said selected copies define a common capture of image data and wherein all errors are evaluated relative to one another as detected from the image data of the same capture.

2. The method in accordance with claim 1, wherein the image data are captured with an image sensor that detects colors.

3. The method in accordance with claim 1, wherein the evaluation derived from the image data is analyzed with regard to a slowly building deviation in the quality of the produced printed matter.

4. The method in accordance with claim 3, wherein the analysis of the evaluation derived from the image data with regard to a slowly building deviation in the quality of produced printed matter occurs by correlating it with a measurement signal of at least one machine sensor.

5. The method in accordance with claim 4, wherein a control device keeps the printing press in an operating state that is proper with regard to printing technology or returns it to such an operating state by evaluating the measurement signal from the at least one machine sensor.

6. The method in accordance with claim 3, wherein, in connection with the evaluation derived from the printed image of the produced printed matter, the settings of aggregates of the printing press are checked for their relevance with regard to the quality of the printed matter to be produced and changed by the control device in order to adhere to quality standards.

7. The method in accordance with claim 1, wherein the copies of the printed matter are produced in a sequence.

8. The method in accordance with claim 7, wherein copies of the sequentially printed matter are evaluated with regard to their quality by columns.

9. The method in accordance with claim 1, wherein a numerically limited quantity of copies is selected out of the copies of printed matter that are produced.

10. The method in accordance with claim 1, wherein the quality of the copies belonging to the selected quantity of copies of the printed matter to be evaluated is classified by an overall evaluation of all of the errors detected within the selected quantity of copies.

11. The method in accordance with claim 1, wherein the printed copies of the printed matter are inspected in a half-sheet evaluation.

12. The method in accordance with claim 1, wherein the severity of each error is evaluated relative to the other detected errors using methods of fuzzy logic.

13. The method in accordance with claim 1, wherein an aggregated classification function (μg1; μg2) is formed by an aggregation of classification functions (μc; μf; μs) that fuzzify at least two different error types.

14. The method in accordance with claim 13, wherein at least two classification functions (μc; μf; μs) are conjunctively aggregated to the aggregated classification functions(μg1; μg2).

15. The method in accordance with claim 13, wherein the aggregated classification function (μg2) is formed at least four dimensionally.

16. The method in accordance with claim 1, wherein at least one of the classification functions (μc; μf; μs) relates to a linear classification.

17. The method in accordance with claim 1, wherein at least one element in at least one of the classification functions (μc; μf; μs) is weighted with one parameter (g).

18. The method in accordance with claim 1, wherein the aggregated classification function (μg1; μg2) is evaluated with regard to a classification threshold (Lmax).

19. The method in accordance with claim 18, wherein the classification threshold (Lmax) for the evaluation of the printed matter as belonging to a quantity of copies that has been classified as good or poor is set at a value.

20. The method in accordance with claim 19, wherein the classification threshold (Lmax) is set at a value between 0.2 and 0.4.

21. The method in accordance with claim 1, wherein the method is performed in the printing press or in a machine processing the printed copies of the printed matter.

22. The method in accordance with claim 1, wherein an established number of sequentially produced copies are respectively combined into a quantity of copies.

23. The method in accordance with claim 22, wherein several quantities of copies are formed one after the other.

24. The method in accordance with claim 23, wherein all produced copies are assigned to one of these quantities of copies.

25. The method in accordance with claim 24, wherein, for each of these quantities, a capture is produced of its respective copies.

26. The method in accordance with claim 1, wherein the evaluation of the quality is made by a comparison of the image captured by the inspection system with at least one reference image.

27. The method in accordance with claim 1, wherein the evaluation of the quality occurs during the ongoing production process of the printing press.

28. The method in accordance with claim 27, wherein a quantity of copies of the printed matter that has been classified as poor is removed from the production process.

29. The method in accordance with claim 1, wherein the evaluation of the quality occurs in the ongoing production process of a machine processing the printed copies of the printed matter.

30. The method in accordance with claim 1, wherein the printed matter is printed in an offset printed method, in a steel engraving printing method, in a serigraphy printing method, or in a hot embossing method.

31. The method in accordance with claim 1, wherein copies of the printed matter are printed on several printed sheets.

32. The method in accordance with claim 31, wherein the copies of the printed matter printed on the printed sheet are evaluated with regard to the quality of their copies at a machine speed of up to 18,000 sheets per hour.

33. The method in accordance with claim 1, wherein the copies of the printed matter are printed on a material web.

34. The method in accordance with claim 33, wherein the copies of the printed matter printed on the material web are evaluated with regard to their quality at a machine speed of up to 15 m/s.

35. The method in accordance with claim 1, wherein the selected quantity of copies of the printed matter is presorted by its classification with regard to a subsequent process step.

36. The method in accordance with claim 35, wherein individual copies of the classified quantity of copies of the printed matter are subjected to an individual examination in the subsequent processing step.

37. The method in accordance with claim 1, wherein the evaluation derived from the printed image of the produced printed matter documents adherence to quality standards.

38. A method for evaluating the quality of printed matter produced by a printing press or printing machine, with the printing machine producing several copies of the same printed matter, comprising the method steps of:

(a) providing an inspection system including an image sensor adapted to create an image data signal in response to sensing the printed copies;

(b) selecting a quantity of copies from the produced copies of the printed matter;

(c) evaluating said image data for the copies in said selected quantity with regard to at least one characteristic belonging to a number of different characteristics of an error, where, within the selected quantity of copies, an error of a particular characteristic detected on at least one of the copies is evaluated in relation to at least one error of a different characteristic detected on the same copy or on a different copy;

(d) fuzzifying features of a characteristic of the error in a classification function (μc; μf; μs); and (e) classifying the printed matter as being of good or poor quality based on the evaluation, wherein said selected copies define a common capture of image data and wherein all errors are evaluated relative to one another as detected from the image data of the same capture.

39. The method in accordance with claim 38, wherein the evaluation derived from the image data is analyzed with regard to a slowly building deviation in the quality of the produced printed matter.

40. The method in accordance with claim 39, wherein the analysis of the evaluation derived from the image data with regard to a slowly building deviation in the quality of produced printed matter occurs by correlating it with a measurement signal of at least one machine sensor.

41. The method in accordance with claim 40, wherein a control device keeps the printing press in an operating state that is proper with regard to printing technology or returns it to such an operating state by evaluating the measurement signal from the at least one machine sensor.

42. The method in accordance with claim 39, wherein, in connection with the evaluation derived from the printed image of the produced printed matter, the settings of aggregates of the printing press are checked for their relevance with regard to the quality of the printed matter to be produced and changed by the control device in order to adhere to quality standards.

43. The method in accordance with claim 38, wherein the copies of the printed matter are produced in a sequence.

44. The method in accordance with claim 43, wherein copies of the sequentially printed matter are evaluated with regard to their quality by columns.

45. The method in accordance with claim 43, wherein the characteristic of the error relates to a number of errors in sequentially printed copies.

46. The method in accordance with claim 38, wherein a numerically limited quantity of copies is selected out of the copies of printed matter that are produced.

47. The method in accordance with claim 38, wherein the quality of the copies belonging to the selected quantity of copies of the printed matter to be evaluated is classified by an overall evaluation of all of the errors detected within the selected quantity of copies.

48. The method in accordance with claim 38, wherein the characteristic of the error relates to the presence of an individual error or multiple errors.

49. The method in accordance with claim 38, wherein the characteristic of the error relates to its respective error magnitude.

50. The method in accordance with claim 38, wherein the printed copies of the printed matter are inspected in a half-sheet evaluation.

51. The method in accordance with claim 38, wherein the severity of each error is evaluated relative to the other detected errors using methods of fuzzy logic.

52. The method in accordance with claim 38, wherein an aggregated classification function (μg1; μg2) is formed by an aggregation of classification functions (μc; μf; μs) that fuzzify at least two different characteristics of an error.

53. The method in accordance with claim 52, wherein at least two classification functions (μc; μf; μs) are conjunctively aggregated to the aggregated classification functions (μg1; μg2).

54. The method in accordance with claim 52, wherein the aggregated classification function (μg2) is formed at least four dimensionally.

55. The method in accordance with claim 38, wherein at least one of the classification functions (μc; μf; μs) relates to a linear classification.

56. The method in accordance with claim 38, wherein at least one element in at least one of the classification functions (μc; μf; μs) is weighted with one parameter (g).

57. The method in accordance with claim 38, wherein the aggregated classification function (μg1; μg2) is evaluated with regard to a classification threshold (Lmax).

58. The method in accordance with claim 57, wherein the classification threshold (Lmax) for the evaluation of the printed matter as belonging to a quantity of copies that has been classified as good or poor is set at a value.

59. The method in accordance with claim 58, wherein the classification threshold (Lmax) is set at a value between 0.2 and 0.4.

60. The method in accordance with claim 38, wherein the method is performed in the printing press or in a machine processing the printed copies of the printed matter.

61. The method in accordance with claim 38, wherein an established number of sequentially produced copies are respectively combined into a quantity of copies.

62. The method in accordance with claim 61, wherein several quantities of copies are formed one after the other.

63. The method in accordance with claim 62, wherein all produced copies are assigned to one of these quantities.

64. The method in accordance with claim 63, wherein, for each of these quantities, a capture is produced of its respective copies.

65. The method in accordance with claim 38, wherein the evaluation of the quality is made by a comparison of the image captured by the inspection system with at least one reference image.

66. The method in accordance with claim 38, wherein the evaluation of the quality occurs during the ongoing production process of the printing press.

67. The method in accordance with claim 66, wherein a quantity of copies of the printed matter that has been classified as poor is removed from the production process.

68. The method in accordance with claim 38, wherein the evaluation of the quality occurs in the ongoing production process of a machine processing the printed copies of the printed matter.

69. The method in accordance with claim 38, wherein the printed matter is printed in an offset printed method, in a steel engraving printing method, in a serigraphy printing method, or in a hot embossing method.

70. The method in accordance with claim 38, wherein copies of the printed matter are printed on several printed sheets.

71. The method in accordance with claim 70, wherein the copies of the printed matter printed on the printed sheet are evaluated with regard to the quality of their copies at a machine speed of up to 18,000 sheets per hour.

72. The method in accordance with claim 38, wherein the copies of the printed matter are printed on a material web.

73. The method in accordance with claim 72, wherein the copies of the printed mailer printed on the material web are evaluated with regard to their quality at a machine speed of up to 15 m/s.

74. The method in accordance with claim 38, wherein the selected quantity of copies of the printed matter is presorted by its classification with regard to a subsequent process step.

75. The method in accordance with claim 74, wherein individual copies of the classified quantity of copies of the printed matter are subjected to an individual examination in the subsequent processing step.

76. The method in accordance with claim 38, wherein the evaluation derived from the printed image of the produced printed matter documents adherence to quality standards.

* * * * *